United States Patent
Betz et al.

(10) Patent No.: US 7,076,530 B2
(45) Date of Patent: Jul. 11, 2006

(54) MULTIPLE FUNCTION MODEM INCLUDING EXTERNAL MEMORY ADAPTER

(75) Inventors: Steve Craig Betz, Zionsville, IN (US); Brian Albert Wittman, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 694 days.

(21) Appl. No.: 09/944,308

(22) Filed: Aug. 31, 2001

(65) Prior Publication Data

US 2003/0046359 A1  Mar. 6, 2003

(51) Int. Cl.
*G06F 15/167* (2006.01)

(52) U.S. Cl. .......................... 709/216; 710/13; 710/5; 711/170

(58) Field of Classification Search ........ 709/213–217, 709/236, 228, 229; 710/305, 8–19, 72, 62; 370/389, 395, 466
See application file for complete search history.

(56) References Cited

U.S. PATENT DOCUMENTS

| | | | | |
|---|---|---|---|---|
| 5,509,083 A | 4/1996 | Abtahi et al. | ............... | 382/124 |
| 5,537,463 A | 7/1996 | Escobosa et al. | ............ | 379/102 |
| 5,739,665 A | 4/1998 | Bares | ............................ | 320/2 |
| 5,745,642 A | 4/1998 | Ahn | ............................. | 386/95 |
| 5,754,655 A | 5/1998 | Hughes et al. | ................ | 380/24 |
| 5,838,773 A | 11/1998 | Eisner et al. | ............. | 379/91.01 |
| 5,920,177 A | 7/1999 | Davis | .......................... | 320/114 |
| 5,926,479 A | 7/1999 | Baran | ......................... | 370/395 |
| 5,929,414 A | 7/1999 | Saitoh | ........................ | 235/380 |
| 6,015,092 A | 1/2000 | Postlewaite et al. | ........ | 235/486 |
| 6,021,129 A * | 2/2000 | Martin et al. | .......... | 370/395.72 |
| 6,044,422 A | 3/2000 | Tran | ............................. | 710/69 |
| 6,134,605 A * | 10/2000 | Hudson et al. | ................ | 710/13 |
| 6,169,569 B1 | 1/2001 | Widmer et al. | ............... | 348/11 |
| 6,181,735 B1 | 1/2001 | Sarat | .......................... | 375/222 |
| 6,271,837 B1 | 8/2001 | Naiff | .......................... | 345/327 |
| 6,370,603 B1 * | 4/2002 | Silverman et al. | ............ | 710/72 |
| 6,611,555 B1 * | 8/2003 | Smith et al. | ................. | 375/222 |

FOREIGN PATENT DOCUMENTS

| | | |
|---|---|---|
| EP | 0984610 A1 | 3/2000 |
| EP | 1109136 A2 | 6/2001 |

* cited by examiner

*Primary Examiner*—Jeffrey C. Pwu
(74) *Attorney, Agent, or Firm*—Joseph J. Laks; Ronald H. Kurdyla; Guy H. Eriksen (57) ABSTRACT

A method and apparatus for bi-directional communication, such as a cable modem, adapted to interface with a plurality of consumer electronics devices such as external storage of memory. The communications device has a first interface adapted to provide data transfer between a host device and a communications network. A second interface is adapted to provide data transfer between the host device and an external storage device or consumer electronics product having a memory storage device. The second interface circuitry is adapted to determine a type of external device coupled thereto and responsively retrieve data therefrom, the retrieved data being provided to the host device.

23 Claims, 5 Drawing Sheets

MULTIPLE FUNCTION MODEM INCLUDING EXTERNAL MEMORY ADAPTER

The invention relates to systems enabling the transfer of data between a communications network and a host device and, more particularly, a multiple function modem providing integrated interface capability to various devices.

BACKGROUND OF THE INVENTION

Modems are currently utilized as discrete computer peripherals that interface a host device such as a personal computer (PC), with an external broadband gateway or access network such as provided by a cable television or telecom company. It is noted that cable, digital subscriber line (DSL) and other modem technologies are used to provide similar broadband access to high-speed networks. Such broadband access enables the high-speed transfer of data between, for example, Internet sites and a PC in the home. Other devices found in many homes include external storage peripherals or consumer electronic devices utilizing a variety of storage media, such as digital cameras, digital audio players, personal digital assistants (PDAs) and computing devices. Associated storage media comprise, for example, floppy disks, ZIP™ cartridges, tape cartridges, magnetic cards, magnetic strips and FLASH memory cards.

A PC must interface with the modem and the various storage media provided by these electronic devices. That is, the owner of a PC, as well as various consumer electronics devices, may wish to transfer data to or from storage devices associated with the consumer electronics devices. To effect the transfer of such data, into or out of the PC for transport, display, playback or other purposes, an interface device is necessary to provide the appropriate read/write functions. Since such a consumer device typically has a unique interface device, a single PC may be interfaced to many external storage devices by respective interface devices. The cost associated with providing so many interface devices can be quite high, the aesthetic result of a desk top cluttered with such interface devices can be quite poor and, generally, a user having a PC interfacing to a variety of external storage devices must have fairly detailed knowledge about the functionality of the PC, the many different interface devices and the storage devices themselves.

SUMMARY OF THE INVENTION

The invention comprises a multiple function communications device adapted to interface with a plurality of consumer electronics devices such as external storage devices whereby the problems associated with the prior art are substantially avoided.

A communications device, in accordance with the principles of the present invention, comprises, in one embodiment of the invention, a first interface adapted to provide data transfer between a host device and a communications network; a second interface adapted to provide data transfer between said host device and an external storage device; wherein the second interface circuitry is adapted to determine a type of external device coupled thereto and responsively retrieve data therefrom, the retrieved data being provided to said host device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

The invention will be described within the context of a host device comprising, illustratively, a personal computer (PC) that is coupled to an access network via a modem. Those skilled in the art will appreciate that the type of modem utilized will depend at least in part upon the type of access network utilized. For example, in a preferred embodiment, a digital cable modem is utilized to interface to an access network comprising a digital cable television system. The access network provides access to, for example, the Internet and/or other networks. Within the context of an access network provided by a telephone company, a modem comprises a digital subscriber line (DSL) modem or other device having interface functions appropriate to the telephone company access network. Other access network types, such as satellite networks, wireless networks and the like, may be accessed via appropriate modem technologies, which technologies may be modified in accordance with the teachings of the present invention.

Figure 1:
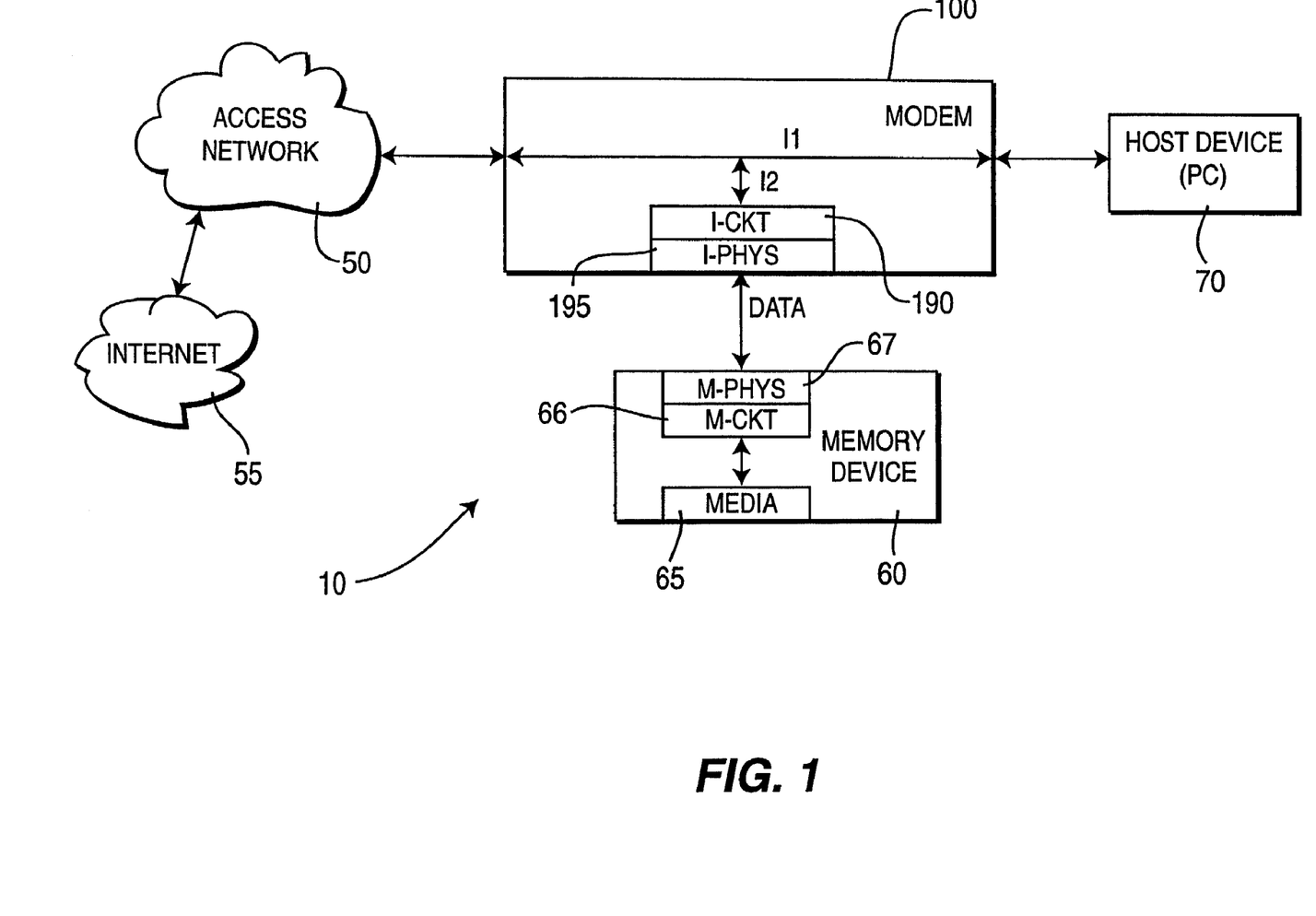
FIG. 1 depicts a high-level block diagram of a system operating in accordance with the principles of the present invention.

FIG. 1 depicts a high-level block diagram of a system operating in accordance with the principles of the present invention. Specifically, FIG. 1 depicts a high-level block diagram of a system 10 in which a host device 70 communicates with an access network 50 via a modem 100. The host device 70, illustratively, comprises a personal computer (PC). The modem 100 comprises, illustratively, a digital cable modem. The access network 50 comprises, illustratively, a digital cable television system. In an exemplary embodiment of the present invention, the access network 50 provides access to at least one other communication network, illustratively the Internet 55.

The modem 100 provides a first interface functionality, I1, adapted to facilitate data communications between the access network 50 and host device 70. Additionally, the modem 100 provides a second interface functionality, I2, adapted to facilitate data communications between an external (to the modem) memory device 60 and the host device 70. It should be noted that the term "external" used in conjunction with the memory device 60 does not necessarily mean that the memory device 60 is housed as a separate device. That is, the memory device 60 may be inserted entirely within the physical housing of the modem 100. Rather, the term "external" is intended to convey a logical separation of memory space between the memory nominally associated with the modem 100 and modem-function operations, and the memory nominally associated with the external memory device 60.

The memory device 60 may comprise or cooperate with any type of storage media 65. In a preferred embodiment, the memory device 60 cooperates with a flash memory card or smart card. The memory device 60 cooperates with a media 65, illustratively a flash read only memory (ROM), a floppy disk, a ZIP™ cartridge, a tape cartridge, a magnetic card, a magnetic memory strip, a FLASH memory card, a smart card with integrated memory, or any one of a plurality of memory device media known to those skilled in the art. The media 65 is accessed via an interface circuit 66 within the memory device 60. The interface circuit 66 cooperates with a physical interface 67 to provide optical or electrical signals representative of data retrieved from the media 65. A data signal DATA is provided to communicate data between the memory device 60 and modem 100.

The modem 100 comprises a physical interface device 195, which cooperates with the physical interface device 67 within the memory device 60 to retrieve data-bearing electrical or optical signals. It will be appreciated by those skilled in the art that intermediate physical access devices, such as cables and the like, may be used to interface between the physical interface devices 195 of modem 100 and 67 of memory device 60. The physical interface device 195 of modem 100 cooperates with interface circuitry 190 to retrieve data from and store data into the memory device 60.

The modem 100 of FIG. 1 is depicted as comprising a first interface functionality or data path I1 between the communications network 50 and host device 70. The data received by the modem 100 from the memory device 60 is coupled to the first interface path I1 via a second interface path I2. Various interface circuitry required to perform this operation is discussed in more detail below with respect to FIG. 2.

The interface circuitry necessary to implement second interface functionality or data path I2 is shown as integrated within the modem 100 of FIG. 1. In an alternate embodiment, this interface circuitry may be external to the modem 100. Additionally, while the second interface path I2 is shown as coupled to interface path I1, in alternate embodiments the interface path I2 comprises a separate path that is coupled to the host device 70 directly, or via a multiplexed arrangement adapted to selectively couple interface path I1 and interface path I2 to the host device 70.

Figure 2:
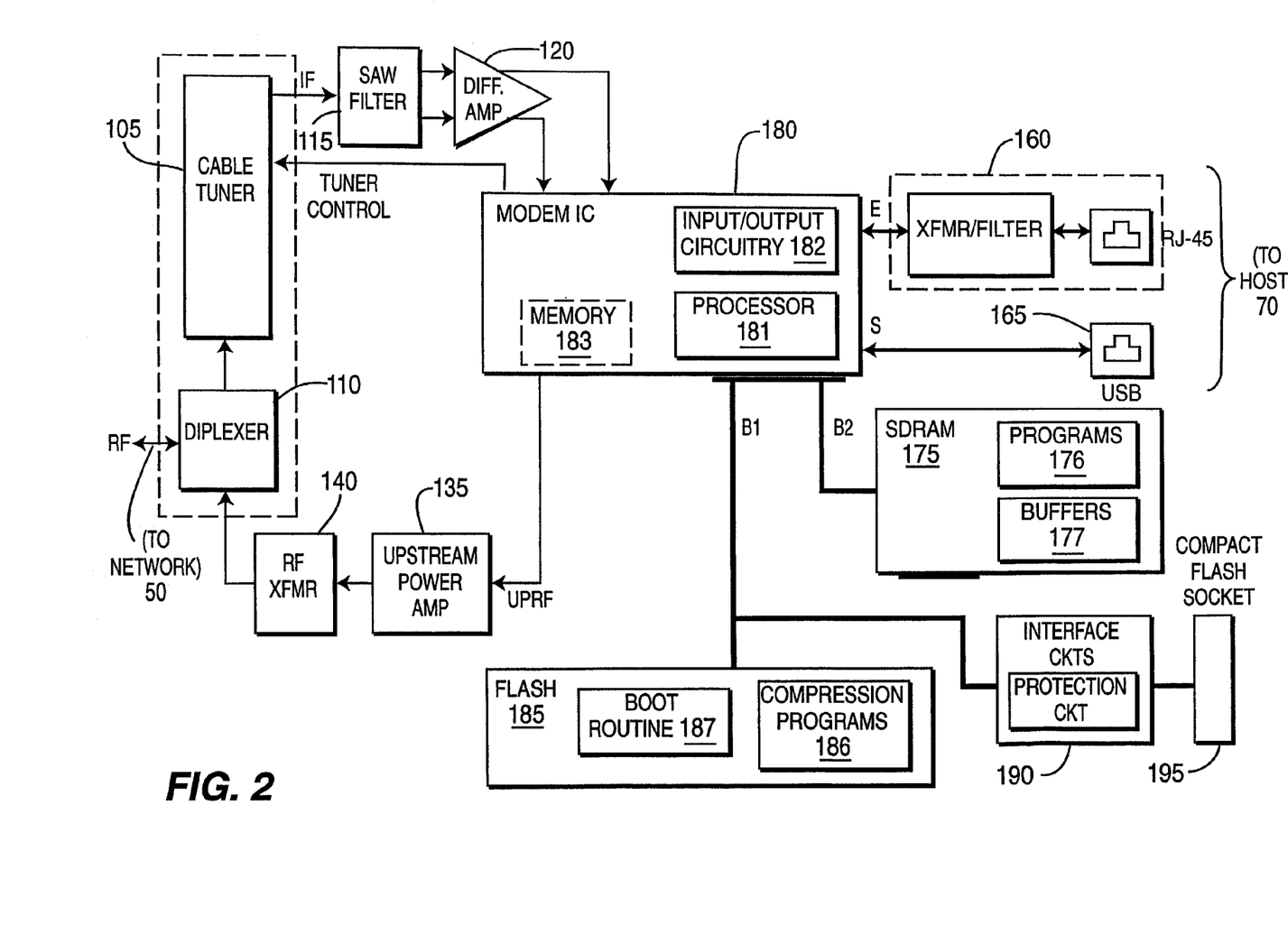
FIG. 2 depicts a high-level block diagram of a modem suitable for use in the system of FIG. 1, in accordance with the principles of the present invention.

FIG. 2 depicts a high-level block diagram of a modem suitable for use in the system 10 of FIG. 1. The modem 100 receives a signal, illustratively a radio frequency (RF) signal from the access network 50, illustratively a digital cable television network. The received RF signal is processed and the resulting data is provided to host device 70 via the first interface function I1. Additionally, a physical interface 195 cooperates with an external memory device 60 to receive additional data via the second interface function I2.

The RF signal is coupled to a diplexer 110, which responsively couples an incoming (i.e., received) RF signal to a cable tuner 105. The cable tuner 105, in response to a tuner control signal TUNER CONTROL (particularly an integrated multiple function modem IC 180) down converts one of a plurality of RF carrier signals to an intermediate signal (IF) frequency signal, which is coupled to a surface acoustic wave (SAW) filter 115. The SAW filter 115 provides standard passband filtering operation adapted to the IF frequency and couples the resulting filtered intermediate frequency signal to a differential amplifier 120. The differential amplifier 120 amplifies the signal and provides it to a modem-integrated circuit (IC) 180.

The modem IC 180 comprises an integrated or single-chip cable modem solution, such as the model BCM3350 chip manufactured by Broadcom Corporation of Irvine, Calif. Data within the "downstream" signal received by the modem IC 180 is coupled to the host 70 via an Ethernet type of network or a universal serial bus (USB) type of network.

In a preferred embodiment, the modem IC 180 performs all processing functions necessary to produce an appropriate Ethernet signal E or serial signal S for communicating to the host 70 via, respectively, an RJ-45 connection (which connection is associated with a transformer/filter function 160) and a USB port 165.

Data to be transferred from the host 70 to the access network 50 is provided to the modem IC 180 via the Ethernet connection E or USB connection S. The modem IC 180 processes the upstream data and provides a corresponding modulated upstream RF signal UPRF to an upstream power amplifier 135. The upstream power amplifier 135 amplifies the upstream RF signal UPRF to produce an increased power signal, which is then coupled to a radio frequency transformer 140. The RF transformer 140 communicates the processed upstream RF signal to the diplexer 110 for subsequent communication to the access network 50 via a corresponding radio frequency (RF) signal.

The above-described operation of the modem 100 of FIG. 2 comprises a basic description of components useful in implementing the first interface functionality I1 discussed above with respect to FIG. 1. That is, the above-described operations of the modem 100 implement a first interface functionality I1 that facilitates data transfer between a host 70 and an access network 50.

The modem IC 180 includes a processor 181, which performs certain processing functions in accordance with the present invention. The modem IC 180 also includes input/output circuitry 182 and, optionally, a memory 183. The memory 183 may comprise a FLASH memory suitable for storing a boot routine, such as will be discussed below with respect to FLASH memory 185.

The modem IC 180 has associated with it a first bus B1, illustratively a parallel data bus, which facilitates communications between the modem IC 180 and a flash memory 185 (and/or flash memory 183). The flash memory 185 stores a boot routine 187 and compressed programs 186. The flash memory 185 is non-volatile, such that removal of power does not result in removal of stored data therein. Upon power up, the boot routine 187 within the flash memory 185 (or a boot routine (not shown) within the memory 183) causes the retrieval of one or more compressed programs 186. The compressed programs are decompressed, and the resulting decompressed programs are stored in a synchronous dynamic random access memory (SDRAM) 175 as programs 176. The SDRAM 175 communicates with the modem IC 180 via a second communication bus B2, illustratively a synchronous data bus. It will be appreciated by those skilled in the art that while the preferred embodiment is described as utilizing compressed programs within FLASH memory 185, these programs need not be compressed. Such compression is utilized to avoid the use of a higher memory capacity FLASH memory 185 and, therefore, to reduce costs.

The SDRAM 175 is depicted as including programs 176 and buffers 177. As previously discussed, the programs 176 are stored after power up and during subsequent operations by the modem IC 180 and, more particularly, the processor 181. The buffers 177 are used to buffer data flowing between the access network 50 and host 70. The buffers 177 are used in conjunction with standard flow control algorithms implemented by the modem IC180 and stored in, for example, the programs 176 portion of SDRAM 175.

Respective first bus B1 and second bus B2 are used in the exemplary embodiment since the SDRAM 175 communicates at a higher speed, and using different signal protocols than those used to communicate with the flash memory 185. In an alternate embodiment, a single bus is used to communicate to both the FLASH memory 185 and a synchronous dynamic random access memory SDRAM 175 having a compatible bus structure.

An interface circuit 190 is coupled to first bus B1 and to a physical interface device 195, illustratively a compact FLASH memory socket. Optionally, the interface circuit 190 includes the protection circuit 191, which allows for hot swapping of media or media carriers in the compact FLASH socket 195.

As previously discussed with respect to FIG. 1, the interface circuitry 190 comprises electrical and/or optical circuitry necessary to support data transfer between a memory device 60 operatively coupled to the physical interface device 195, electrical/optical interface device 190 and the modem IC 180. A second interface functionality I2 is thereby effected between a memory device physically received by the socket 195 and the host 70. The second interface path I2 comprises a data path supported by bus B1, the modem IC 180 and one or both of the Ethernet E or USB S data paths.

Figure 3:
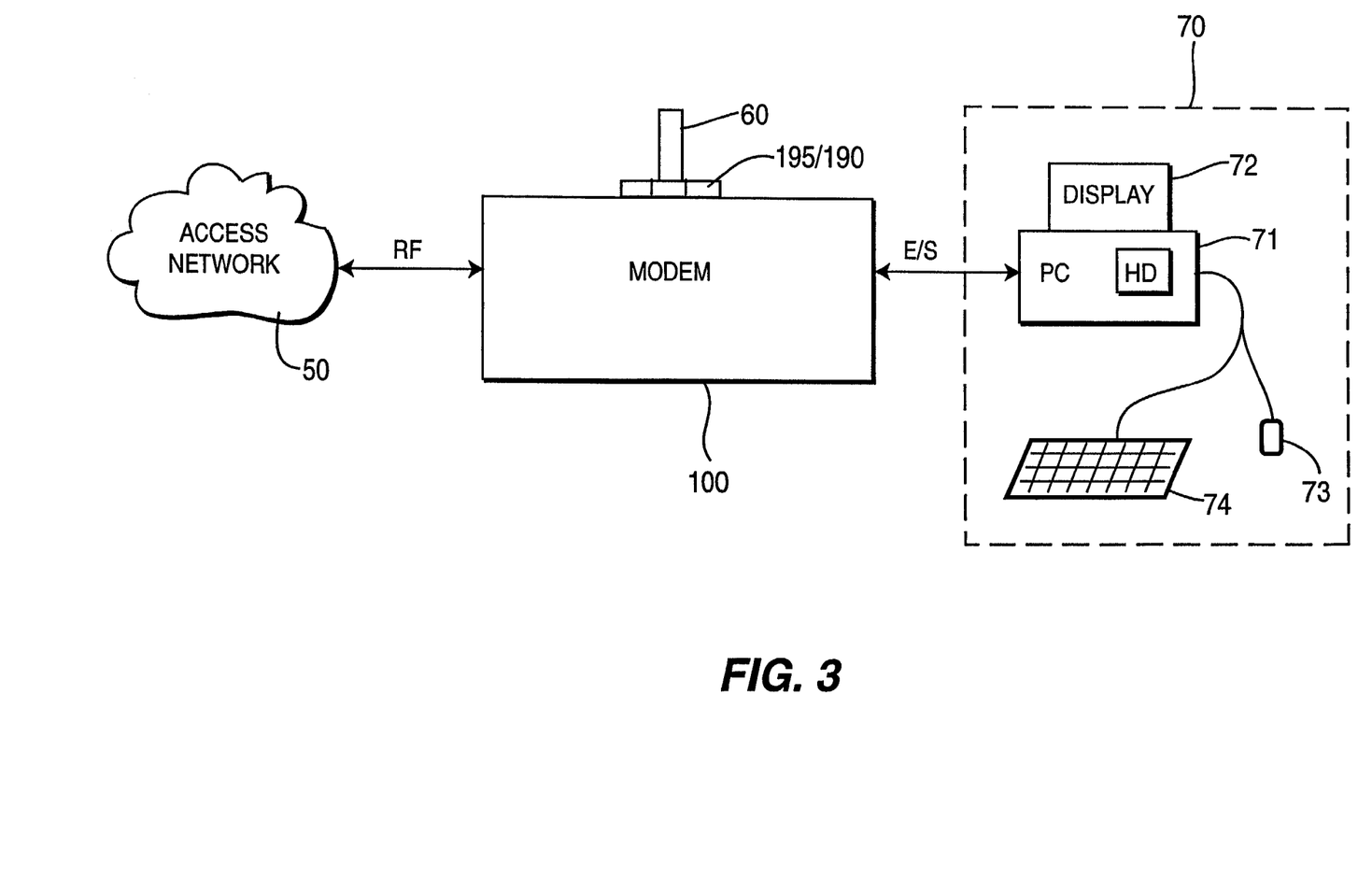
FIG. 3 depicts an embodiment of a product implementation in accordance with the principles of the present invention.

FIG. 3 depicts an embodiment of a product implementation in accordance with the principles of the present invention. Specifically, a host 70 comprising a personal computer (PC) 71 operatively coupled to a display device 72, keyboard 74 and pointing device (e.g. —mouse) 73 communicates with a modem 100 via an Ethernet or USB data path E/S. The modem 100 communicates with an access network 50 via a radio frequency signal path RF. Additionally, the modem 100 has associated with it a physical interface device 195/190 (such as described above with respect to FIG. 2), which physically receives, and electrically or optically cooperates with, an external memory device 60.

As previously discussed, the external memory device 60 may comprise any one of a number of memory devices, such as memory "sticks" or other devices used to store still or moving imagery, audio files (such as MP3 or .WAV files) and the like. In one embodiment of the invention, the personal computer operates to retrieve MP3 audio files from the Internet 55 via the access network 50 and modem 100. The retrieved MP3 files are stored in a mass storage device such as a hard disk (HD) within the PC 71. Upon detecting the insertion of a memory device 60 into the physical interface 195 of the modem 100, the PC 71 causes the second data interface path I2 to be established and a stored MP3 file to be "uploaded" to the memory device 60. In this embodiment, a memory device 60 cooperates with, for example, an MP3 player. Alternatively, an MP3 player, typically having a relatively small form and an accessible physical interface, functionality may be directly coupled to the physical interface 195.

A computing device capable of implementing methods according to the present invention is formed using the processor 181 and input/out (I/O) circuitry 182 within the modem IC 180, as well as FLASH memory 185 and/or memory 183 and SDRAM 175. The processor 181 cooperates with conventional support circuitry (not shown) such as power supplies, clock circuits, cache memory and the like as well as circuits that assist in executing the software routine stored in the FLASH memory 185 and SDRM 175. As such, it is contemplated that some of the process steps discussed herein as software processes may be implemented within hardware, for example, as circuitry that cooperates with the processor 181 to perform various steps. The modem IC 180 also contains input/output (I/O) circuitry 182 that performs an interface between the modem IC 180, the access network 50, the host 70 and the first B1 and second B2 buses.

Although the modem IC 180 and, more particularly, the operations of processor 181, I/O circuitry 182 and memory 175/185 are discussed herein in terms of a general purpose computer that is programmed to perform various detection and processing functions in accordance with the present invention, the invention can be implemented in hardware as, for example, an application specific integrated circuit (ASIC), such as a modem IC 180 including additionally memory 183. As such, the process steps described herein are intended to be broadly interpreted as being equivalently performed by software, hardware, or a combination thereof.

Figure 4:
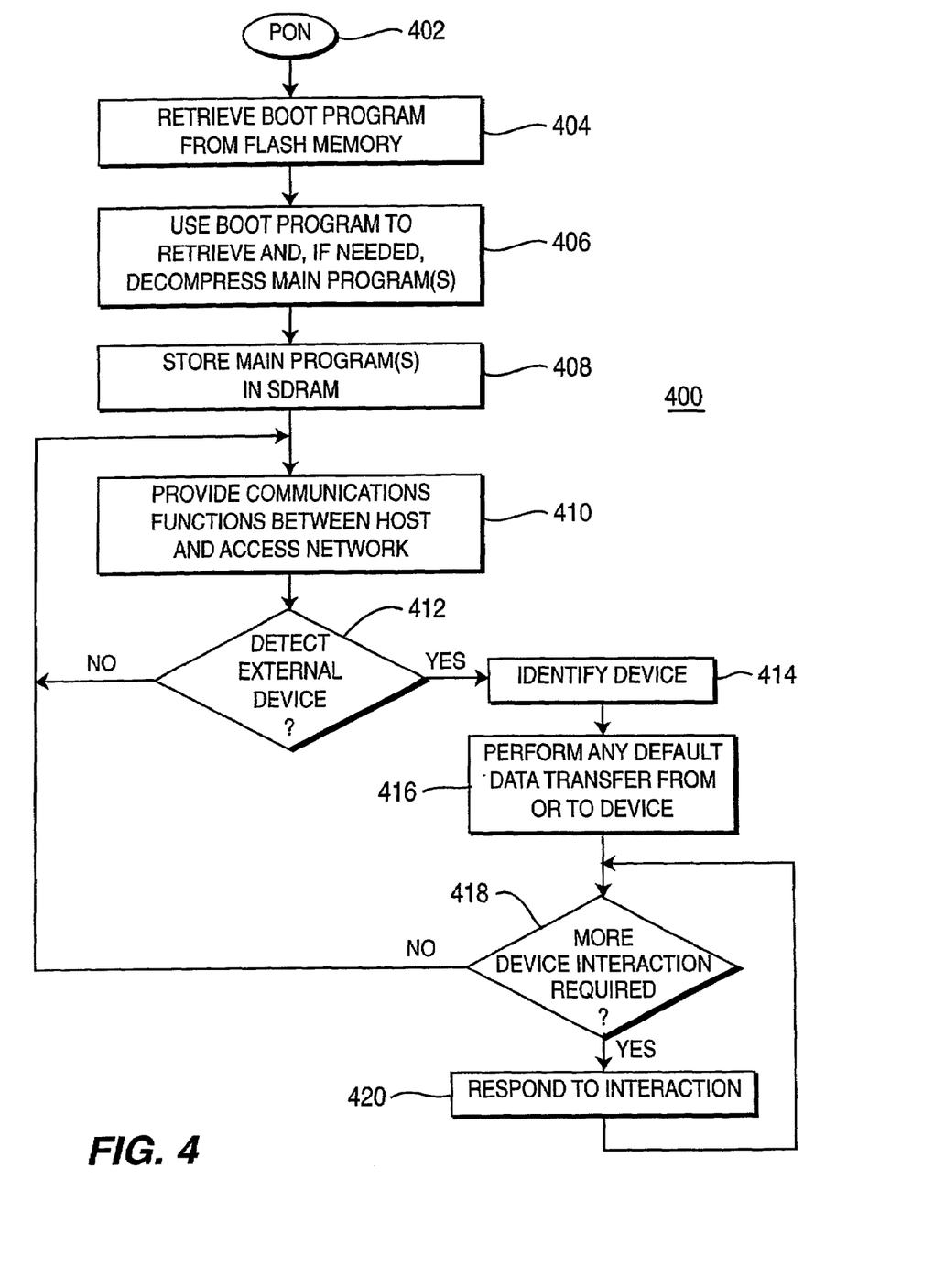
FIG. 4 depicts a flow diagram of a processing method suitable for use in the modem of FIGS. 1–3 and in accordance with the principles of the present invention.

FIG. 4 depicts a flow diagram of a processing method suitable for use in the modem 100 of FIGS. 1–3, in accordance with the principles of the present invention. Specifically, the processing method 400 is entered at step 402 when a power on (PON) condition is initiated for the modem. At step 404, a boot program is retrieved from the FLASH memory or from another memory source (e.g., hard coded into the modem IC 180 within, for example, a memory region 183). At step 406 the boot program is used to retrieve and, if necessary, decompress one or more programs stored within the FLASH memory 185. At step 408, the decompressed main programs are stored in the SDRAM 185.

At step 410, the modem 100 provides communications functions between the host 70 and access network 50. That is, at step 410, the first or primary interface functionality of the modem is provided to the host device.

At step 412, a determination is made as to whether an external device has been detected cooperating with the physical 195 or electrical/optical 190 portions of the external device interface. If no device is detected, then standard communications continue to be provided at step 410. If a device is detected, then at step 414 the device is identified.

At step 416, any default data transfer to or from the identified device is performed. For example, in the case of a detected device comprising a memory stick or other memory device associated with a digital camera, a default data transfer may comprise the retrieval of image data from the external memory device, communication of the retrieved image data to the host device 70 and storage of the image data within a memory (e.g., mass storage device HD) within the host device 70. Similarly, in the case of an MP3 player being identified, MP3 files previously selected for transfer to the MP3 device are retrieved from the mass storage device HD of the host device 70 and transferred to the MP3 device. Data transfer to or from the external device is provided via the second interface channel I2.

At step 418 a determination is made as to whether more device interaction is required. That is, at step 418 a determination is made as to whether user commands or other interactions with the external device via the host device are appropriate. If more device interactions are not required, then the method 400 proceeds to step 410 where communication functions between the host and access networks are continued. Otherwise, at step 420 the method responds to such device interactions, and the query at step 418 is repeated.

Figure 5:
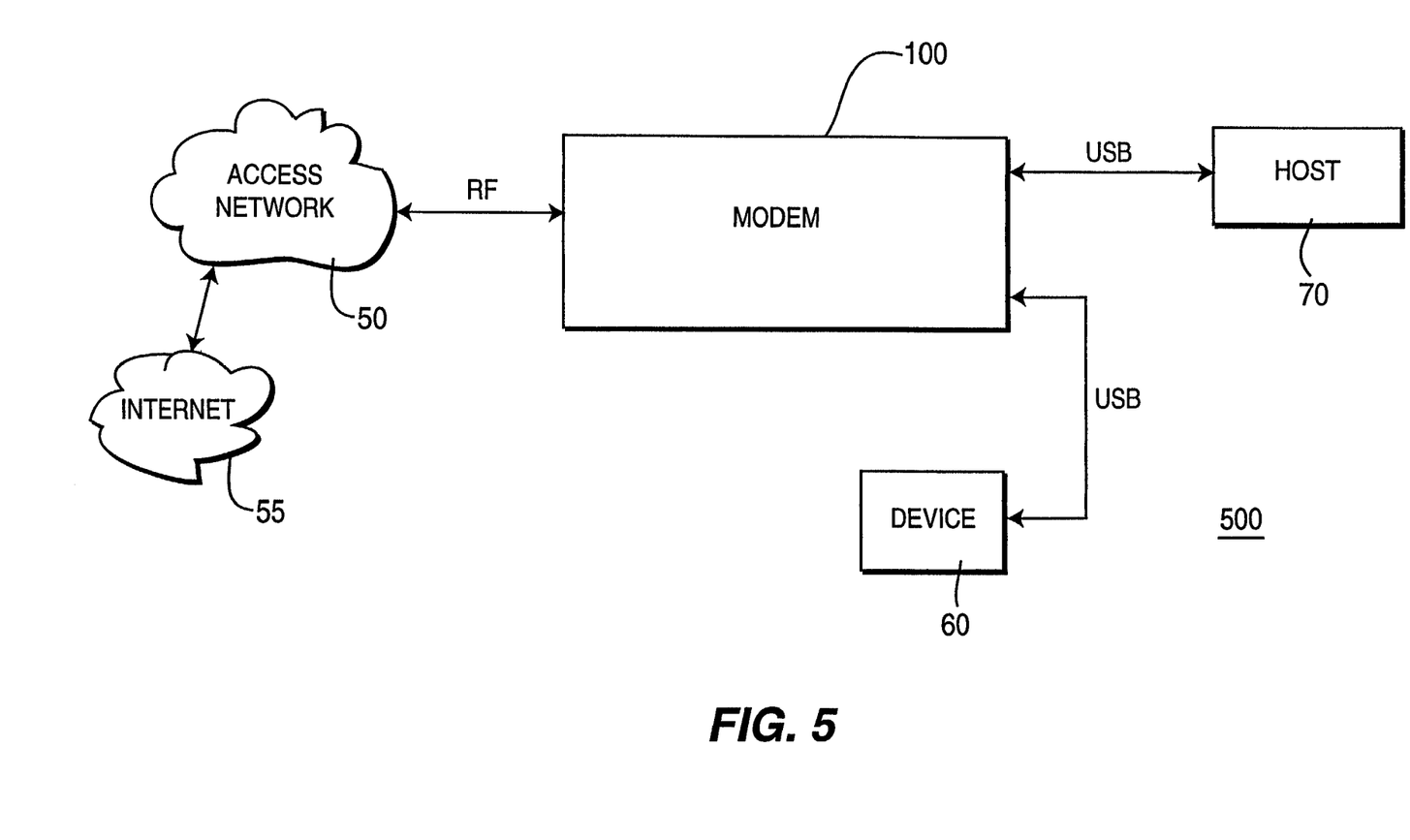
FIG. 5 depicts an alternate embodiment of the system of FIG. 1, in accordance with the principles of the present invention.

FIG. 5 depicts an alternate embodiment of the system of FIG. 1, in accordance with the principles of the present invention. Specifically, FIG. 5 depicts the access network 50, modem 100, external memory device 60 and host 70 substantially as described above with respect to FIG. 1. However, the system 500 of FIG. 5 interconnects the devices as follows: the host device 70 is coupled to the modem 100 via the universal serial bus (USB). The external memory device 60 is connected to the modem 100 via a second USB interface. In this embodiment, the cable modem 100 implements a USB hub functionality, which allows additional USB-capable devices and/or external memory devices to be connected to the host 70 via USB. In this embodiment, the modem 100 and external device 60 are logically presented to the host device 70 as two separate devices on the USB. Since the modem 100 is acting as a USB hub in this embodiment, any data transfers between the network 50 and the external device 60 must necessarily involve the host 70.

In another embodiment of the invention described below with respect to FIG. 5, the modem operates both as a USB host (to the external device 60) and a USB peripheral (to the host 70). In this embodiment, the modem is capable of transferring data directly between the access network 50 and external memory device 60. Thus, at step 416 of FIG. 4, the default data transfer may comprise the retrieval of information from servers via the Internet and storage of that retrieved information in the external memory device 60. Such information may comprise, for example, audio and/or video files, such as MP3 files. Similarly, the data stored within the memory device may, as a default condition, be uploaded to a web site directly from the memory device 60 using the modem operating as a USB host. Other permutations and combinations will be readily appreciated by those skilled in the art.

In one embodiment of the invention, the modem 100 of any of FIGS. 1, 2, 3 and 5 comprises a Broadcom Model BCM 3350, manufactured by Broadcom Corporation of Irvine, Calif. The BCM 3350 performs the cable modem PHY and MAC layer information flow management functions, as well as read/write functions. The modem software is stored in a memory block or device, for example, FLASH memory 185. The modem instruction set may be periodically upgraded by upgrading the program within the FLASH memory. The bus B1 comprises the internal BCM 3350 bus used to couple the flash memory and the processor or CPU internal to the modem chip. By tapping into this bus, the external device, such as device 60 in FIG. 5 may be provided with a read/write capability such that a Compact Flash (CF) card or other appropriate media may be accessed. Advantageously, a CF card may be physically engaged and disengaged without removing power from the modem, this process being known as "hot" insertion.

In one embodiment of the invention, a DOCSIS certified cable modem is implemented. In one DOCSIS embodiment, the cable modem provides USB and Ethernet connections to the host (i.e., a PC). In addition, in one embodiment of a cable modem incorporating the principles of the present invention, the cable modem includes a slot into which a CF card is inserted. This cable modem, in accordance with the principles of the present invention, operates in, optionally, two modes of operation. In a first mode of operation, the cable modem and CF interface are separate and independent functions, though they share the Ethernet and/or USB connection to the PC. In the second mode of operation, the CF interface operates in conjunction with the cable modem to download and store and/or upload information to and from the access network without intervention by the PC.

In a first mode of operation, the PC accesses the CF interface via the Ethernet or USB connection to the cable modem utilizing PC-based software. The CF "appears" to the PC as just another mounted drive. In the first mode of operation, there is relatively little integration of the cable modem and CF interface functions, other than sharing the Ethernet or USB connection to the PC. This first mode of operation advantageously allows a customer to reduce the amount of desktop clutter and eliminate the need for another device to provide a CF interface.

In a second mode of operation, the cable modem operates autonomously or semi-autonomously (i.e., with no or little PC intervention) to download information from the Internet, such as audio files, news reports, program downloads and updates, video clips, and the like, and store the downloaded information on a CF card (or other memory device 60). Similarly, data stored on the memory device 60, such as email messages, JPEG pictures, and the like, can be uploaded to the Internet. Optionally, this downloading (or uploading) operation is provided even when the attached PC is turned off. Thus, the second mode of operation requires a program executable by the cable modem processor(s) that enables the cable modem to determine which Internet sites are accessible, which files to download or upload and other information. In this embodiment, an application program running on the PC may provide the appropriate program to the modem for autonomous operation. Alternatively, an HTML server having, illustratively, a default address known to the modem manufacturer, may be accessed by the modem upon modem power up to ensure that appropriate software resident within the modem is executed to implement this functionality. In a second mode of operation in which information is uploaded from a memory card to an Internet site via the modem, a default Internet Protocol (IP) or HTML address may be provided by the modem, the interface card manufacturer or by the PC, such that the upload of image from, for example, a digital camera, may be performed autonomously. Optionally, the software necessary to provide autonomous or semi-autonomous operation may be transferred from the CF card directly into the cable modem's internal FLASH memory. In this embodiment of the invention, the FLASH memory card includes information or data enabling the modem to retrieve the information from the memory card and route the information to an appropriate HTML address or to the host device.

Although various embodiments, which incorporate the teachings of the present invention, have been shown and described in detail herein, those skilled in the art can readily devise many other varied embodiments that still incorporate these teachings.

What is claimed is:

1. A modem, comprising:
   first interface circuitry adapted to provide data transfer between a host device and a network; and
   second interface circuitry adapted to provide data transfer between a memory device and at least one of said host device and said network, the second interface circuitry including an external connection portion for externally and detachably connecting the memory device to the modem for uploading and downloading data to at least one of the host and the network,
   wherein the data is unrelated to functions performed by the modem.

2. The modem of claim 1, wherein said network comprises one of a digital cable network and a digital subscriber line (DSL) network.

3. The modem of claim 1, wherein said second interface circuitry is adapted to determine a type of memory device coupled thereto.

4. The modem of claim 1, wherein:
in response to a default data transfer condition, data is transferred between said memory device and at least one of said host device and a computer communicating with said network.

5. The modem of claim 1, wherein said memory device is associated with an audio player and, in response to a default data transfer condition, audio data is transferred to said memory device from at least one of said host device and a computer communicating with said network.

6. The modem of claim 1, wherein said memory device is associated with an imaging device and, in response to a default data transfer condition, image data is transferred from said memory device to at least one of said host device and a computer communicating with said network.

7. The modem of claim 1, wherein said second interface circuitry is adapted to receive a smart card with integrated memory.

8. The modem of claim 1, wherein said second interface is adapted to receive a compact FLASH memory card.

9. The modem of claim 1, wherein a data bus of a first type is used to communicate data between said memory device and said modem, and a data bus ala second type is used to communicate data between said host device and said modem.

10. The modem of claim 1, wherein said memory device has stored therein a program, said second interface circuitry being adapted to responsively transfer said program to said modem for execution.

11. The modem of claim 10, wherein said program stored in said memory device is compressed, said modem decompressing said program prior to executing said program.

12. The modem of claim 1, wherein:
said modem, operating as a universal serial bus (USB) hub, transfers data between said memory device and said host device via a USB communications path.

13. The modem of claim 1, wherein:
said modem, enables said memory device to be accessed by said host device via at least one of an Ethernet communications ink and a universal serial bus (USB) communications link.

14. Apparatus comprising:
a modem for transferring data between a host computing device and a network, said modem having associated with it a first data bus operatively coupled to a flash memory having stored therein at least an initial operating program; and
an interface circuit, operatively coupled to said first data bus and a physical interface device, said physical interface device adapted to receive a memory device and including an external connection portion for externally and detachably connecting the memory device to the modem for uploading and downloading data to at least one of the host and the network, said interface circuit adapted to provide data transfer between said memory device and said modem using said first data bus, said modem adapted to transfer data between said memory device and at least one of said host device and said network, wherein the data is unrelated to functions performed by the modem.

15. The apparatus of claim 14, wherein said network comprises one of a digital cable network and a digital subscriber line (DSL) network.

16. The apparatus of claim 14, wherein said second interface circuitry is adapted to determine the type of memory device coupled thereto.

17. The apparatus of claim 14, wherein:
in response to a default data transfer condition, data is transferred between said memory device and at least one of said host device and a computer communicating with said network.

18. The apparatus of claim 14, wherein said second interface circuitry is adapted to determine a type of memory device coupled thereto.

19. The apparatus of claim 14, wherein said memory device has stored therein a program, said second interface circuitry being adapted to responsively transfer said program to said modem for execution.

20. A method, comprising:
detecting the insertion of a memory device into an interface operatively coupled to a modem, said modem including first interface circuitry adapted to provide data transfer between a host device and a network, said modem including second interface circuitry including an external connection portion for externally and detachably connecting the memory device to the modem for uploading and downloading data to at least one of the host and the network; and
in response to a default data transfer condition, transferring data between said detected memory device and at least one of said host device and said network, wherein the data is unrelated to functions performed by the modem.

21. The method of claim 20 wherein said data transfer comprises the transfer of audio data to said detected memory device from at least one of said host device and a computer communicating with said network.

22. The method of claim 20, wherein said data transfer comprises the transfer of image data from said detected memory device to at least one of said host device and a computer communicating with said network.

23. The method of claim 20, further comprising:
determining the type of memory device inserted into said interface device.

* * * * *